United States Patent [19]
Bennett

[11] 3,964,179
[45] June 22, 1976

[54] TELEPHONE SYSTEM TEACHING APPARATUS

[76] Inventor: Stanley W. Bennett, 5227 Thunder Hill Road, Columbia, Md. 21045

[22] Filed: Nov. 7, 1974

[21] Appl. No.: 521,927

[52] U.S. Cl. .................. 35/31 R; 35/35 R
[51] Int. Cl.² .......................... G09B 19/00
[58] Field of Search ............ 35/5, 6, 8 R, 8 A, 9 R, 35/9 A, 9 B, 30, 31 R, 35 C, 35 R, 14, 48 R; 179/2 A, 6 E

[56] References Cited
UNITED STATES PATENTS

| | | | |
|---|---|---|---|
| 3,114,210 | 12/1963 | Uttal | 35/6 |
| 3,238,644 | 3/1966 | Hayes | 35/14 X |
| 3,535,797 | 10/1970 | Leslie et al. | 35/9 A |
| 3,609,227 | 9/1971 | Kuljian | 35/35 C X |
| 3,614,322 | 10/1971 | Joslow et al. | 35/35 C X |
| 3,624,929 | 12/1971 | Swanson et al. | 35/48 R |
| 3,654,708 | 4/1972 | Brudner | 35/9 A |
| 3,688,416 | 9/1972 | Koenig et al. | 35/31 R |
| 3,810,316 | 5/1974 | Lahlou | 35/35 C X |
| 3,865,985 | 2/1975 | Stankus | 179/2 A X |

*Primary Examiner*—Richard C. Pinkham
*Assistant Examiner*—Vance Y. Hum
*Attorney, Agent, or Firm*—John N. Randolph

[57] ABSTRACT

An apparatus utilizing a functioning telephone system for teaching children of elementary school age number discrimination, mathematic concepts, letter discrimination and coding, spelling, improved reading comprehension, and a variety of other verbal concepts. The apparatus is especially adapted for use in schools. It is operated solely by students and includes a telephone switchboard which is electrically connected to a plurality of modified touch-tone telephones. While the telephone users may talk with one another when their telephones are connected through the switchboard, communication between the telephone users and switchboard operator is entirely by visually presented instructions.

5 Claims, 13 Drawing Figures

3,964,179

TELEPHONE SYSTEM TEACHING APPARATUS

SUMMARY

It is a primary object of the present invention to provide a unique apparatus employing a complete telephone system intended to be operated by children which will require children to utilize considerable initiative to effect efficient operation of the apparatus.

Another object of the invention is to provide a telephone system in connection with the use of which the telephone operator and telephone users may communicate with one another only by visual signals, including illuminated legends by means of which the operator transmits information and instructions to a telephone user and other illuminated legends by means of which the user conveys his or her desires to the telephone operator.

A further object of the invention is to provide such an apparatus parts of which may be readily modified to teach certain academic subjects, such as mathematical concepts, letter discrimination, decoding, and reading.

Various other objects and advantages of the invention will hereinafter become more fully apparent from the following description of the drawings, illustrating a presently preferred embodiment thereof and therein:

DESCRIPTION OF THE PREFERRED EMBODIMENT

Figure 1:
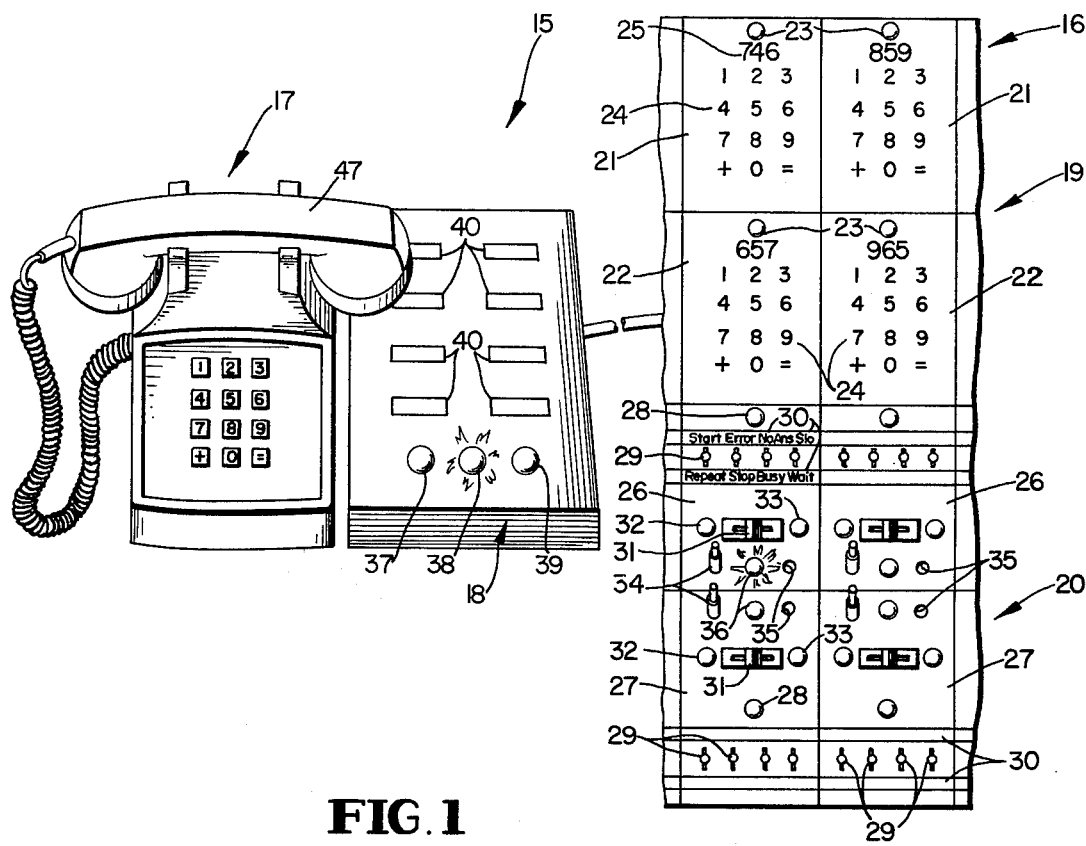
FIG. 1 is a view partly in top plan and partly in perspective illustrating a part of the apparatus when not in use.

Referring more specifically to the drawings, the telephone system teaching apparatus in its entirety is designated generally 15 and includes a switchboard 16, portions only of which are illustrated in FIGS. 1 to 6, a plurality of modified Touch-Tone telephones 17 and a signal box 18, associated with each telephone 17.

The switchboard 16 includes a top panel 19 and a bottom panel 20. The top panel 19, which is disposed at an incline upwardly from the bottom panel 20, has a row of upper signal display sections 21 and a row of lower signal display sections 22. Each section or area 21 and 22 includes a light bulb 23, adjacent to the top thereof, and a series of legends 24, each disposed on a translucent window located over a light source. The legends 24 are in four horizontal rows with three legends to each row, the first three rows including the numerals "1" to "9" in sequence, and the bottom row consisting of "+" "0" and "=". Between the light bulb 23 and the legends 24, appears a phone number 25, here shown as consisting of three digits.

The bottom panel 20 includes a row of upper signal transmitting sections 26 and a row of lower signal transmitting sections 27. The sections 26 are associated with the sections 21 which align therewith and the sections 27 are associated with the sections 22 which align therewith. Each section 26 and 27 includes a light bulb 28, a row of four single-pole, double-throw switches 29, and two rows of legends 30, between which the switches 29 are disposed. Each section 26 and 27, also includes a single-pole, double-throw switch 31 interposed between two light bulbs 32 and 33; a telephone plug 34, a telephone jack 35 and a light bulb 36 interposed between the plug 34 and jack 35.

The wiring of each telephone 17 has been modified and the legend "*" on one bottom pushbutton has been changed to "+" and the legend " # " of another bottom pushbutton has been changed to "=".

The signal box 18 associated with each telephone 17 includes three distinctively colored light bulbs 37, 38 and 39, disposed adjacent to the bottom thereof and eight translucent panels 40 disposed thereabove and arranged in two rows of four panels each. Each panel 40 includes a legend and covers a light source.

Figure 13:
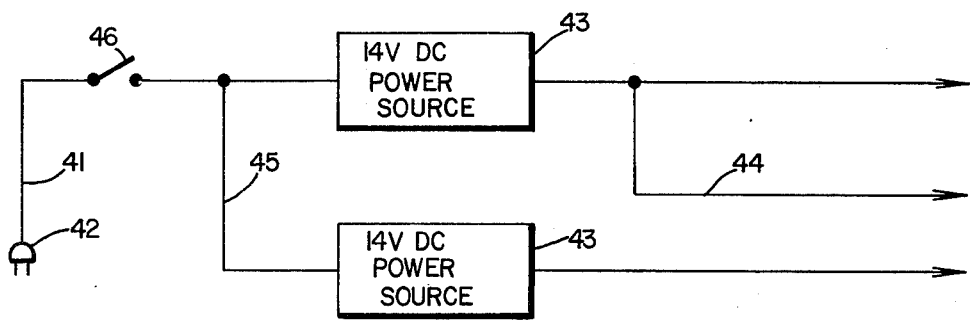
FIG. 13 is illustrates the primary electric circuits of the apparatus.

FIG. 13 illustrates the primary electric circuit of the apparatus 15 including a conductor 41 having a plug 42 for connection with a conventional domestic electrical outlet. A stepdown transformer or the like 43 is interposed in the conductor 41 for converting the alternating current to direct current and reducing the current to fourteen volts. The conductor 41 supplies current to the switchboard 16. A branch conductor 44 of the conductor 41 which is located beyond the converter 43 connects with each of the signal box indicator lights 38. A branch conductor 45, which leads from the conductor 41, between the plug 42 and converter 43, is connected with all of the buzzers of the apparatus 15 and has a second converter 43 interposed therein. A switch 46 is interposed in the conductor 41 between the plug 42 and branch conductor 45.

Figure 2:
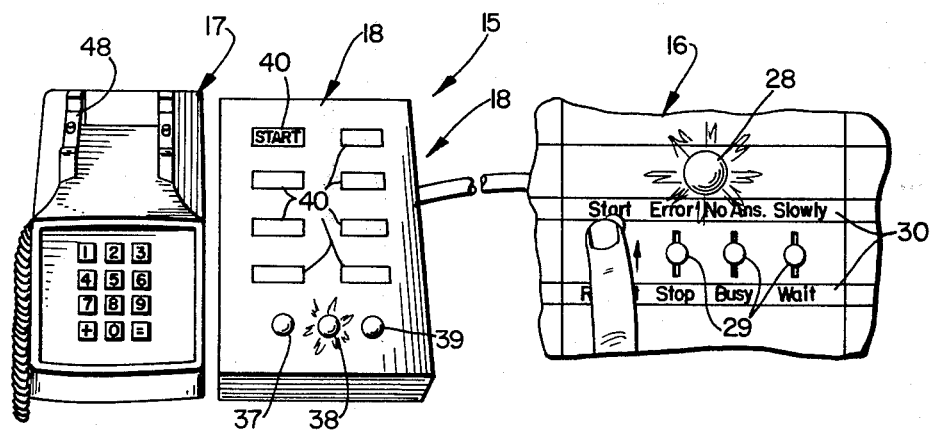
FIG. 2 is a view partly in perspective and partly in top plan showing parts of the apparatus after use of which has been commenced.
Figure 3:
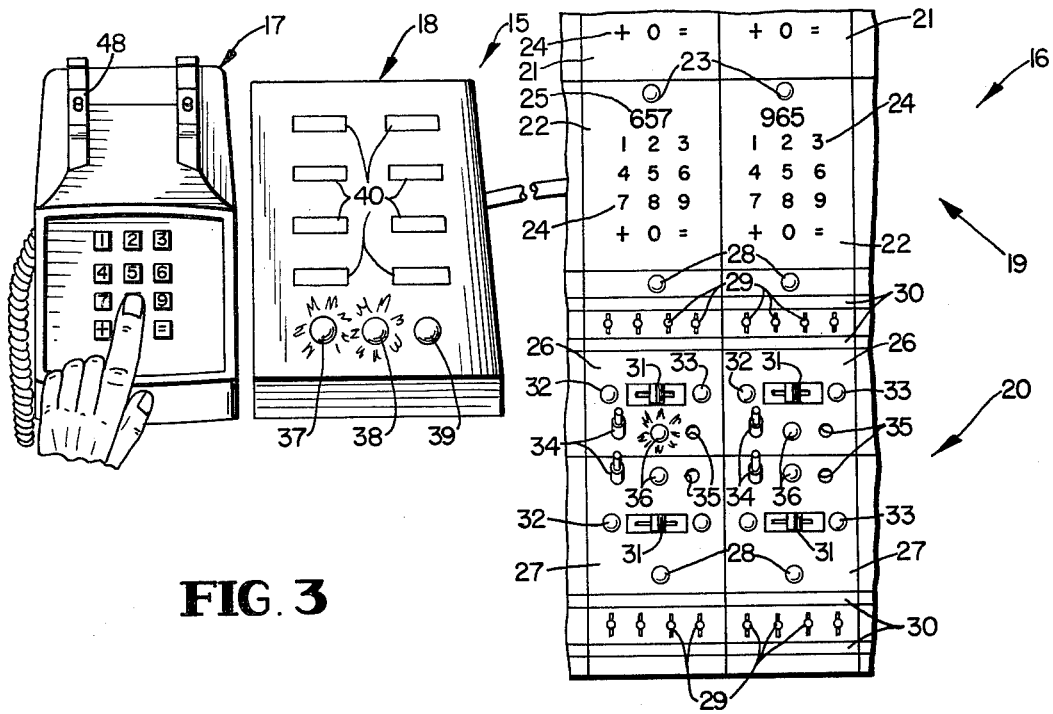
FIG. 3 is a view similar to FIG. 1 illustrating additional use of the apparatus.
Figure 5:
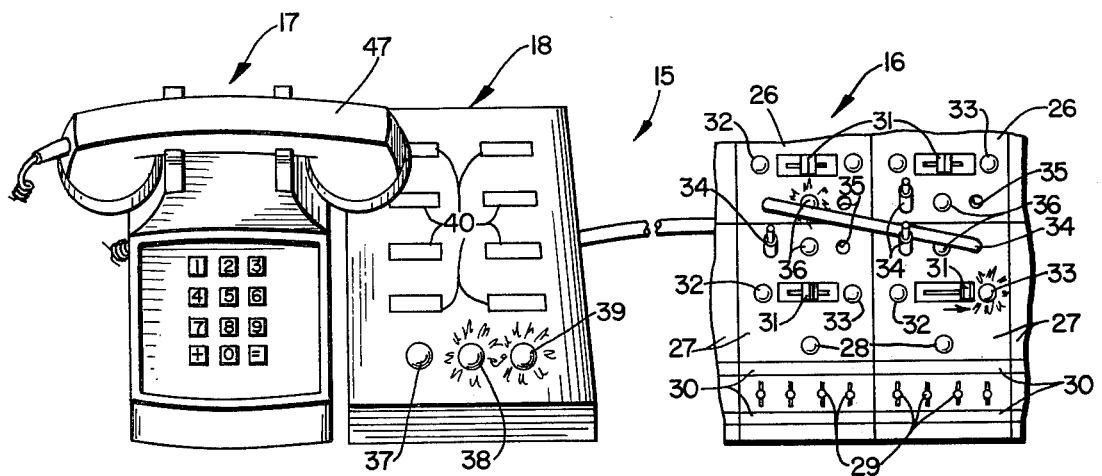
FIG. 5 is a view partly in top plan and partly in perspective illustrating a portion of the switchboard, a telephone and its associated signal box to which a call is being made.
Figure 9:
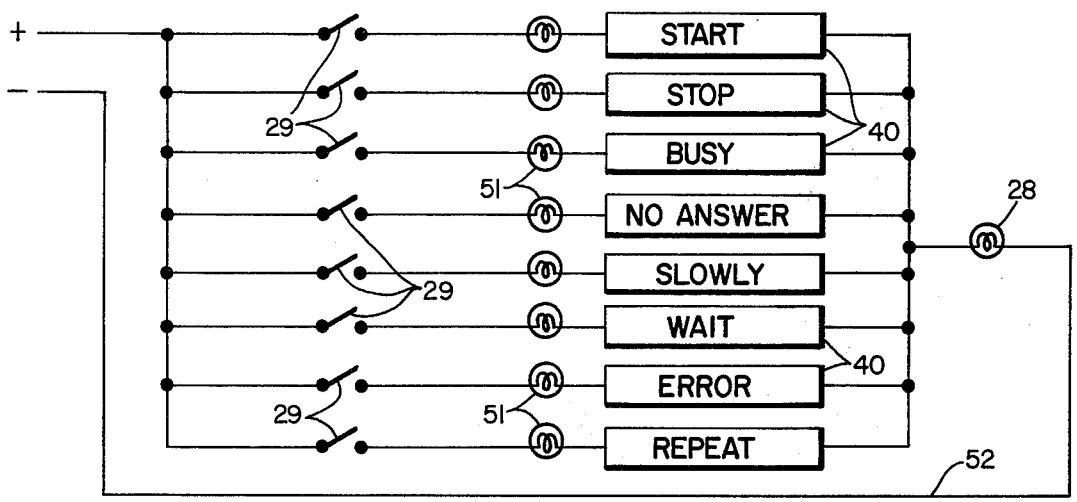
FIG. 9 is a diagramatic view illustrating electric circuits between the switchboard and signal box of one telephone.
Figure 10:
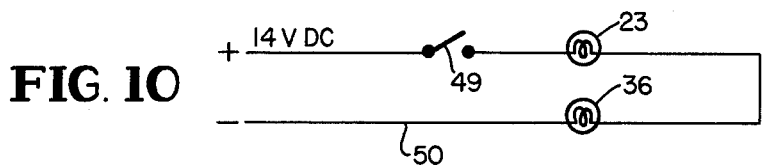
FIG. 10 is a diagramatic view illustrating an electric circuit between a telephone and the switchboard which is actuated by removal of the telephone receiver from the telephone cradle.

In FIG. 1, the indicator light 38 is shown illuminated to indicate that the switch 46 is closed and that the apparatus 15 is functional. In FIG. 2, the handset 47 has been removed from the cradle 48 for closing the handset switch 49 of the telephone 17, as illustrated diagramatically in FIG. 10, to thereby close the circuit 50 for energizing the light bulbs 23 and 36 which are wired thereto. The operator at the switchboard 16 will then push the lefthand switch 29 of the panel section 26 in which the bulb 36 is illuminated to the start position, as seen in FIG. 2. This will cause a light bulb 51 located beneath the "start" panel 40 and the bulb 28 of said panel 26 to be energized, as illustrated in FIG. 2, to thereby visually indicate to the telephone user that he or she should commence dialing the number desired. The circuit 52 for connecting each set of switches 29 to a signal box 18 is illustrated in FIG. 9 and includes conductors 52 in which the switches 29 and the light bulbs 28 and 51 are interposed.

The telephone user then commences to dial the number desired. Assuming that the call was to telephone number 965, the user would depress button "9". This would close switches 53 and 54 of the circuit 55, FIG. 7, for energizing the light bulb 56 of numeral "9" of the legend 24 of panel section 21, and also light bulb 37 of the signal box 18 of the telephone 17, being dialed. The button 6 would then be depressed for closing switches 57 and 54 for energizing the light bulb 56 under the numeral 6 of panel section 21. Button 5 would next be depressed for closing switches 57 and 58 for energizing the bulb 56 under numeral 5.

Each Touch-Tone button closes two switches. Button Number 1 closes switches 59 and 60, button number 2 closes switches 59 and 58, button number 3 closes switches 59 and 54, button number 4 closes switches 57 and 60, button number 5 closes switches 57 and 58, button number 6 closes switches 57 and 54, button number 7 closes switches 53 and 60, button number 8 closes switches 53 and 58, button number 9 closes switches 53 and 54, button + closes switches 61 and 60, button number 0 closes switches 61 and 58, and button = closes switches 61 and 54. Depressing each button illuminates a light bulb 56 and bulb 37. The wiring of the circuit 55 includes diodes 62 interposed between the switches 54, 58, and 60, and switches 59, 57, 53 and 61, to prevent current backup.

Figure 7:
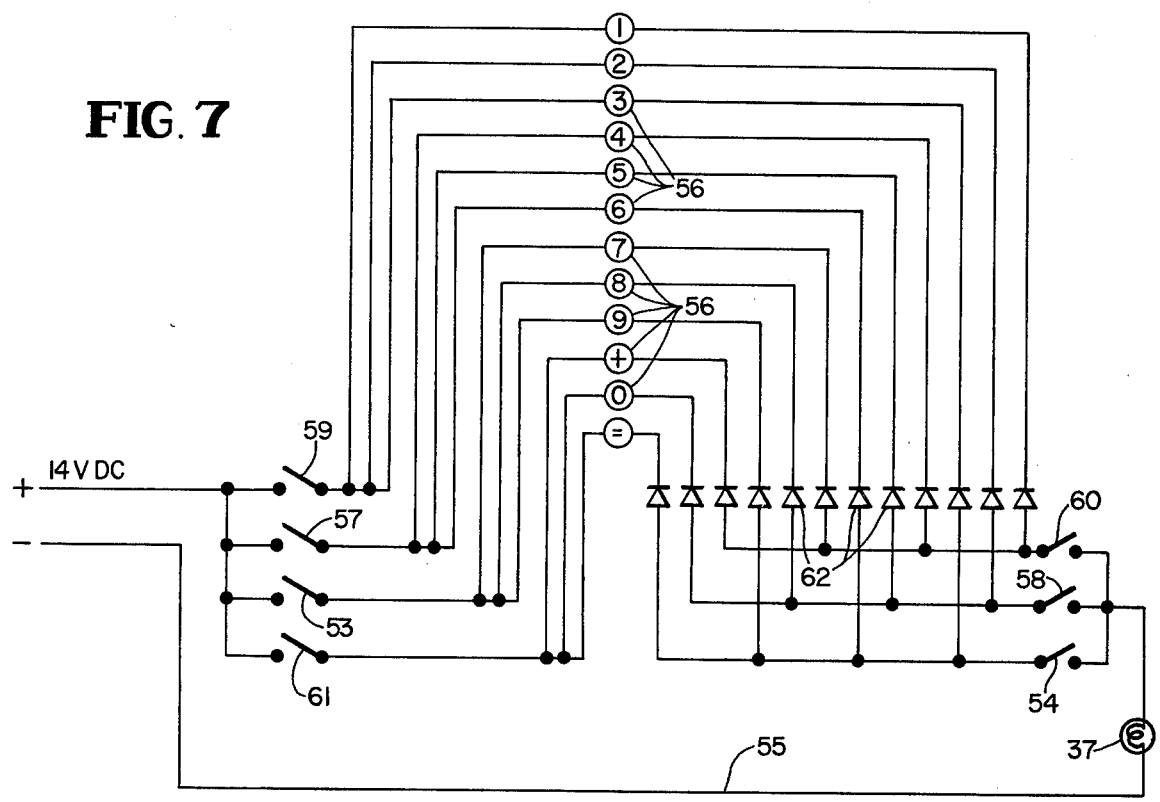
FIG. 7 is a diagramatic view illustrating the electric circuits involved between a Touch-Tone telephone and the switchboard enabling a call to be placed from the telephone.
Figure 8:
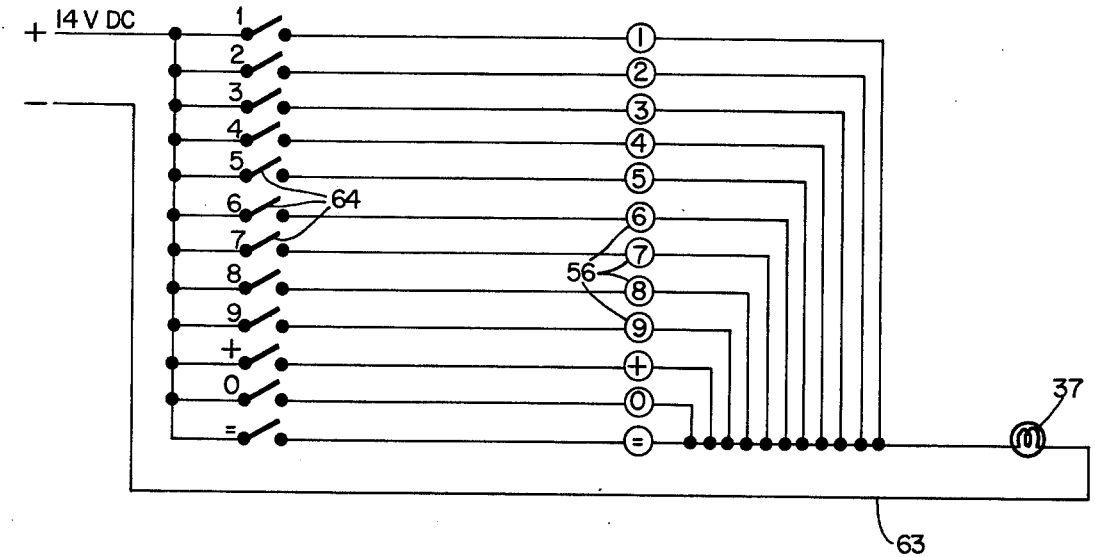
FIG. 8 is a diagramatic view illustrating the electric circuit which could be utilized in lieu of the electric circuit of FIG. 7 if single pole pushbutton switches were substituted for the Touch-Tone switches.

FIG. 8 illustrates another electric circuit 63 which could be substituted for the circuit 55 and wherein twelve conventional single-pole pushbutton switches 64 could be substituted for the switches of FIG. 7. With the circuit of FIG. 8, the diodes 62 may be omitted.

The switchboard operator may desire to have the number repeated in which case the switch 29 would be moved toward the word "repeat" to illuminate the bulb 51 beneath the word "repeat" on a window 40, or other of the switches 29 may be actuated to give other instructions to the telephone user, such as to wait until the operator is free, to dial more slowly, to stop dialing or to be instructed that an error has been made in dialing.

Figure 4:
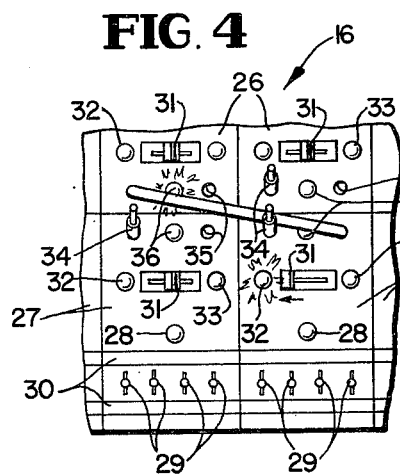
FIG. 4 is a plan view of a part of the switchboard.
Figure 6:
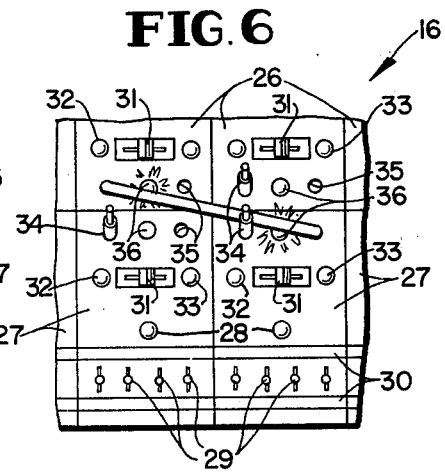
FIG. 6 is a plan view of the switchboard part of FIG. 5 after the call has been completed.
Figure 11:
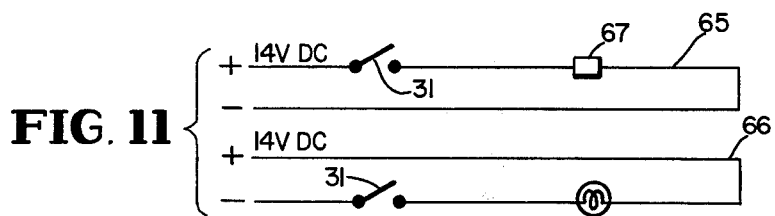
FIG. 11 is a diagramatic view illustrating the electric circuits operated from the switchboard for signalling the call to a particular telephone.
Figure 12:
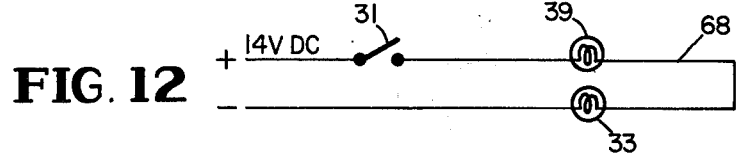
FIG. 12 is a diagramatic view illustrating the electric circuit after the signal of FIG. 11 has been changed from an audible to a visual signal.

The switchboard operator then removes the plug 34 from the panel 26, beside which the bulb 36 is illuminated, and inserts said plug into the jack 35 of the panel 27, which corresponds with the panel 22 having the telephone number "965", as seen in FIG. 4. The operator then moves the switch 31 of said panel 27 to the left, as seen in FIG. 4, for simultaneously closing the two circuits 65 and 66 of FIG. 11 for energizing a buzzer 67 in the signal box 18 of the telephone being called and for energizing the light bulb 32 of said panel 27, as seen in FIG. 4. The operator then moves said switch 31 from its position of FIG. 4 to its position of FIG. 5 for energizing the light bulb 33 on said panel 27 and the bulb 39 in the signal box 18 of the telephone being called, to visually indicate to the user of said telephone that the sound of the buzzer heard emanates from his or her signal box, as illustrated by the electric circuit 68 of FIG. 12. If the telephone is answered, light bulb 36 of said panel 27 will be illuminated as will the light bulb 23 of the panel 22, which is associated with said panel 27. The operator then moves the switch 31 back to its intermediate off position. If telephone number 965 is busy or fails to answer, the operator will move the appropriate switch 29 of the panel 26 which is associated with the panel 21 of the telephone which initiated the call to indicate visually on one of the windows 40 that the telephone being called is not answering or is busy. The operator will then proceed to serve the next caller.

The aforementioned operation and use of the apparatus 15 functions as a method of teaching number discrimination which can be enhanced by changing the telephone number each day or week and by varying the number of digits utilized.

Addition, subtraction, multiplication or division may be taught by making the telephone numbers into appropriate arithmetic operations. For example, a phone number might be 7+9=. The caller would then be required to push button 7 the + button, then button 9, then the = button and finally buttons 1 and 6. A variety of other mathematical concepts could be learned in a similar way, including fractions, decimal equivalents, solving algebraic equations, etc.

Letter discrimination, decoding, comprehension and various verbal concepts could be taught by converting the pushbutton numbers to letters. This could be accomplished by applying snap-on caps over pushbuttons and having the letters of the alphabet appearing on these caps. Two or three letters could appear on each cap with a different number of dots beside each letter. To then dial a particular letter, a pushbutton would then have to be depressed a number of times corresponding to the number of dots associated with the letter. The 0 button could be employed as a space bar and function to space the letters. The operator's switchboard panels 21 and 22 would require modification in the same manner as the telephone pushbuttons. If words were employed as telephone numbers, a list of numbers could be given as pictures, thereby requiring the caller to spell the depicted word in order to correctly make the call. The apparatus could also be utilized in teaching verbal concepts as by describing characteristics such as "it has four legs, fur and barks." The caller would then have to recognize this description as referring to a dog and would have to correctly dial the letters spelling dog.

Various other modifications and changes are contemplated and may obviously be resorted to, without departing from the function or scope of the invention.

I claim as my invention:

1. A teaching apparatus for use in teaching number discrimination, mathematical concepts, letter discrimination, reading and various verbal concepts, comprising a telephone switchboard having a plurality of signal display sections and a plurality of signal transmitting sections, a plurality of telephones each including a cradle and handset, electric circuits including switches electrially connecting each telephone to one of said signal display sections and to signal transmitting section associated with said signal display section, signal generating means connected to said electric circuits whereby when any telephone handset is removed from its cradle visual signals will be illuminated on the signal display section and the signal transmitting section associated therewith, a signal box associated with each telephone and electrically connected to the signal transmitting section thereof, said signal box having a plurality of light sources each disposed beneath an indicia bearing window, said signal transmitting section having a plurality of switches by which the light sources beneath said windows can be selectively energized for visually transmitting instructions to the student telephone user, said signal display section having symbols corresponding to the dialing symbols of the telephone and each associated with a light source electrically connected to said telephone symbol whereby the student telephone user can visually transmit to the student operator through said signal display section the designation of a telephone to be called, each of said transmitting sections having a plug and a jack whereby the student operator can remove the plug from the transmitting section connected with a calling telephone and apply it to the transmitting section connected to the telephone to be called, and a switch mounted on each transmitting section and connected to an audible and visual signal of the signal box associated therewith, said last mentioned switch being movable to one position for actuating the audible signal and thereafter to another position for actuating the visual signal of the signal box of the telephone being called.

2. A teaching apparatus as in claim 1, further comprising an electric signal on each transmitting section for visually indicating to the student operator when the telephone being called is answered.

3. A teaching apparatus as in claim 2, further comprising indicia associated with each signal display section for indicating the telephone and signal box to which said display section and its associated transmitting section are connected.

4. A teaching apparatus as in claim 1, further comprising additional switches carried by said transmitting section and connected to other of the light sources of the signal box thereof for visually advising the caller that the call cannot be completed, that an error was made in dialing or that the operator is not at that moment available.

5. A teaching apparatus as in claim 1, wherein certain of the dialing symbols of the telephone comprise mathematical symbols for use with other numerical symbols for teaching mathematical concepts.

* * * * *